R. E. HELLMUND AND S. G. NOTTAGE.
COIL RETAINING DEVICE FOR DYNAMO ELECTRIC MACHINES.
APPLICATION FILED JUNE 8, 1917.
1,320,056.
Patented Oct. 28, 1919.
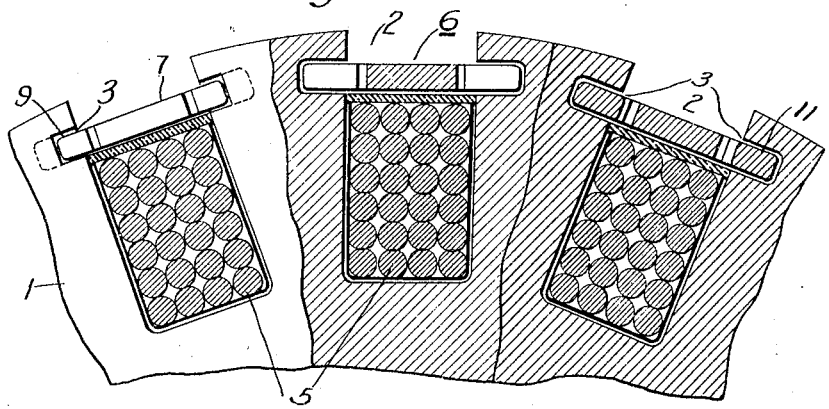
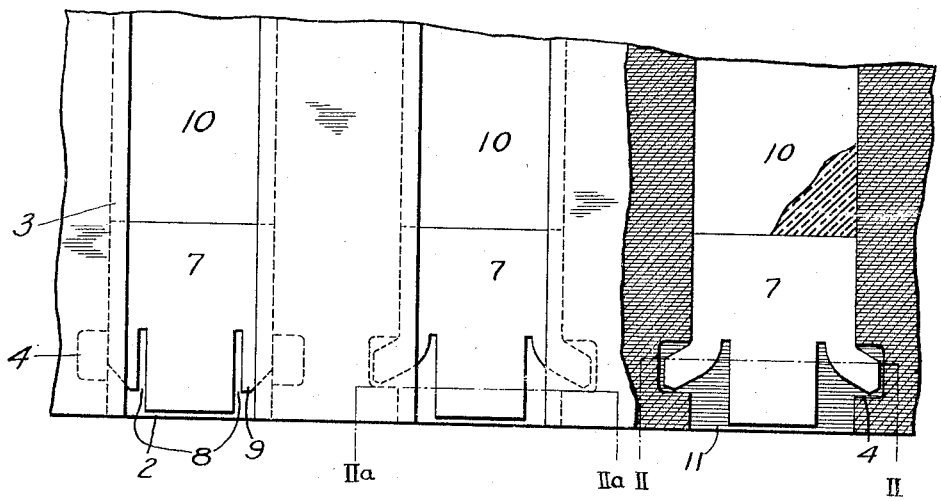
WITNESSES:
Fred S. Nilharm
Fred H. Miller
INVENTORS
Rudolf E. Hellmund &
Stanley G. Nottage
BY
Wesley G. Carr
ATTORNEY

UNITED STATES PATENT OFFICE.

RUDOLF E. HELLMUND, OF SWISSVALE, AND STANLEY G. NOTTAGE, OF WILKINSBURG, PENNSYLVANIA, ASSIGNORS TO WESTINGHOUSE ELECTRIC AND MANUFACTURING COMPANY, A CORPORATION OF PENNSYLVANIA.

COIL-RETAINING DEVICE FOR DYNAMO-ELECTRIC MACHINES.

1,320,056.          Specification of Letters Patent.          Patented Oct. 28, 1919.

Application filed June 8, 1917. Serial No. 173,559.

*To all whom it may concern:*

Be it known that we, RUDOLF E. HELLMUND, a subject of the Emperor of Germany, and a resident of Swissvale, in the county of Allegheny and State of Pennsylvania, and STANLEY G. NOTTAGE, a subject of the King of Great Britain, and a resident of Wilkinsburg, in the county of Allegheny and State of Pennsylvania, have invented a new and useful Improvement in Coil-Retaining Devices for Dynamo-Electric Machines, of which the following is a specification.

Our invention relates to coil-retaining devices for dynamo-electric machines and has particular relation to coil-retaining devices that are adapted to be applied to the open core slots of such machines.

Coil-retaining devices that are employed on induction motors and other similar dynamo-electric machines are often subjected to severe magnetic and centrifugal forces tending to displace them. Consequently, it has been customary to employ unitary metallic wedging members possessing considerable mechanical strength. Metallic wedging members, however, must be effectively insulated from the core, thereby materially increasing the cost of such members, as compared with those composed of insulating material.

The object of our invention is to provide a simple, compact and readily applied coil-retaining device for effectually holding the coils of open-slot machines in their proper positions against the action of centrifugal, magnetic and other forces tending to displace them that is composed only in part of conducting material.

Most coil-retaining devices, as heretofore constructed, have depended upon the friction between the wedging members and the sides of the slot to retain them in position which, however, does not positively lock the members against longitudinal movement in the slot. It has been proposed to positively lock the wedging members against longitudinal movement by bending projecting portions thereof around the ends of the slots but such an expedient possesses the considerable disadvantage that the projecting portions of the wedging members set up objectionable noises in high-speed machines.

By our invention, we provide means for positively locking the wedging members against longitudinal movement intermediate the ends of the slots.

In the accompanying drawing, Figure 1 is a plan view of a portion of a dynamo-electric machine embodying our invention, and Fig. 2 is a view, partially in elevation and partially in section, the sections being taken along the lines 11—11 and 11ª—11ª of Fig. 1.

Referring to the drawing, a core member 1 is provided with a plurality of slots 2 having substantially parallel side walls provided with grooves 3 near their outer edges. Each groove 3 is enlarged to form a recess 4 near one end, the purpose of which will be set forth later. Coils 5 are located in the slots 2 and are held in position by coil-retaining devices 6. Each device 6 consists of a metallic member 7 having longitudinal slots 8 near one end which form projections 9. The member 7 is preferably composed of non-magnetic material, such as brass, and may be manufactured cheaply and expeditiously, as by punching from sheet metal. Each device 6 further comprises a wedging member 10 preferably composed of hard and durable insulating material.

After a coil 5 has been placed in position, the member 10 is driven into the grooves 3, it being so proportioned as to leave a vacant space at each end of the slot 2. A metallic member 7 is then driven to position from each side of the core member 1 until its end abuts the member 10 after which a suitable tool is inserted in the grooves 8 and the projections 9 are bent outwardly into the recesses 4, as shown at 11. The bent projections lock the members 7 and 10 against longitudinal movement while the portions thereof that are located in the grooves 4, prevent radial movement.

While we have shown the metallic members applied at the end portions of the slots, it is obvious that these members may also be applied intermediate the end portions within the spirit and scope of our invention, and we desire that only such limitations shall be imposed as are indicated in the appended claims.

We claim as our invention:

1. In a dynamo-electric machine, the combination with a core member having a plurality of coil-containing slots provided with side recesses, of devices for holding the coils in position having slotted end portions thereof bent into said side recesses to positively lock said devices against longitudinal movement in the slots.

2. In a dynamo-electric machine, the combination with a magnetizable core member having a plurality of coil-containing slots, the side walls of which are provided with longitudinal grooves near their outer edges and with lateral recesses near their ends, of members for holding the coils in position, each of which is provided with longitudinal end slots forming relatively narrow edge projections that are bent outwardly into the said lateral recesses.

3. In a dynamo-electric machine, the combination with a magnetizable core member having teeth which form slots for the reception of coils and are provided with side grooves near their outer edges and relatively deep recesses near the ends of the grooves, of coil-retaining members the edges of which engage the side grooves in the teeth and the ends of which have portions bent into the recesses in said teeth.

4. In a dynamo-electric machine, the combination with a core member having a plurality of coil-containing slots, of devices for holding the coils in position comprising metallic and non-metallic members disposed in end-to-end relation.

5. In a dynamo-electric machine, the combination with a core member having a plurality of coil-containing slots, the side walls of which are provided with longitudinal grooves near their outer edges, of coil-retaining devices comprising separate metallic and non-metallic members disposed in end-to-end relation in said slots and each having portions extending into said grooves.

6. In a dynamo-electric machine, the combination with a core member having a plurality of coil-containing slots, the side walls of which are provided with longitudinal grooves near their outer edges and with lateral recesses near their ends, of devices for holding the coils in position comprising a centrally disposed non-metallic portion, the edges of which engage the said grooves, and separate metallic portions disposed in end-to-end relation with said non-metallic portion, the edges of which also engage the said grooves and having portions thereof bent into said side recesses.

In testimony whereof we have hereunto subscribed our names this 28th day of May, 1917.

RUDOLF E. HELLMUND.
STANLEY G. NOTTAGE.

Copies of this patent may be obtained for five cents each, by addressing the "Commissioner of Patents, Washington, D. C."